(12) United States Patent
Liberatore et al.

(10) Patent No.: US 8,850,990 B2
(45) Date of Patent: Oct. 7, 2014

(54) METHOD AND APPARATUS FOR CONTROLLING AND ENHANCING TRACTIVE EFFORT IN DC TRACTION MOTORS ON LOCOMOTIVES

(75) Inventors: Aldo Liberatore, London (CA); Viktor Gvelesiani, London (CA)

(73) Assignee: ZTR Control Systems, London (CA)

( * ) Notice: Subject to any disclaimer, the term of this patent is extended or adjusted under 35 U.S.C. 154(b) by 82 days.

(21) Appl. No.: 13/304,114

(22) Filed: Nov. 23, 2011

(65) Prior Publication Data
US 2012/0160125 A1 Jun. 28, 2012

Related U.S. Application Data

(60) Provisional application No. 61/417,101, filed on Nov. 24, 2010.

(51) Int. Cl.
*B61C 11/00* (2006.01)
*H02P 5/68* (2006.01)
*H02P 5/685* (2006.01)
*B60L 3/10* (2006.01)
*B60L 3/00* (2006.01)

(52) U.S. Cl.
CPC ............... *B60L 3/0061* (2013.01); *H02P 5/68* (2013.01); *Y02T 10/648* (2013.01); *H02P 5/685* (2013.01); *B60L 2220/20* (2013.01); *B60L 3/106* (2013.01)
USPC ........................................................ 105/34.2

(58) Field of Classification Search
USPC .......................... 105/26.05, 34.1, 34.2, 49, 61
See application file for complete search history.

(56) References Cited

U.S. PATENT DOCUMENTS

| | | | |
|---|---|---|---|
| 4,896,090 A | 1/1990 | Balch et al. | |
| 6,634,303 B1 | 10/2003 | Madsen et al. | |
| 7,126,293 B1 * | 10/2006 | Kumar | 318/52 |
| 2010/0162918 A1 | 7/2010 | Earleson | |

* cited by examiner

*Primary Examiner* — R. J. McCarry, Jr.
(74) *Attorney, Agent, or Firm* — Brett J. Slaney; John R. S. Orange; Blake, Cassels & Graydon LLP

(57) ABSTRACT

A system is provided for powering a locomotive. The system comprises a plurality of traction motor assemblies, each assembly comprising an armature and a field; a first power source connected in series to each armature; and in specific circumstances, a second power source connected across the fields. A method of controlling traction power in a locomotive is also provided, the method comprising: identifying which of a plurality of traction motor armatures in the locomotive has a highest current reading; and ramping a traction motor field current to equal the highest current reading for the traction motor armatures.

26 Claims, 12 Drawing Sheets

METHOD AND APPARATUS FOR CONTROLLING AND ENHANCING TRACTIVE EFFORT IN DC TRACTION MOTORS ON LOCOMOTIVES

This application claims priority from U.S. Provisional Application No. 61/417,101 filed on Nov. 24, 2010, the contents of which are incorporated herein by reference.

TECHNICAL FIELD

The following relates to methods and apparatus for controlling and enhancing tractive effort in DC traction motors on locomotives.

BACKGROUND

DC traction motors used to drive wheels on locomotives are traditionally series connected, meaning that the field of the traction motor is in series with the armature of the traction motor. A series connected DC motor exhibits advantageous torque characteristics at low speeds, enabling a locomotive to pull a heavy train from a dead stop. An undesirable characteristic of a series connected DC motor is that if the wheel it is coupled to starts slipping and increasing speed under lower load conditions, the resultant combination of higher armature voltage and lower field current can result in uncontrolled continuous increases in motor speed. Unchecked, this can result in a severely damaged or destroyed traction motor. There are several generations of wheelslip control mechanisms that have been developed to prevent such an occurrence, with each generation of control mechanism adding finer control, thus allowing greater protection and providing higher tractive effort. The latest generation utilizes complex mechanical and electrical sensing techniques that individually control each traction motor using power electronics. The use of power electronics can be expensive to build, expensive and complex to troubleshoot and maintain, and consumes a great deal of the limited space available on the locomotive.

It is an object of the following to address the above-noted disadvantages.

SUMMARY

In one aspect, there is provided a system for powering a locomotive, the system comprising: a plurality of traction motor assemblies, each assembly comprising an armature and a field; a first power source connected in series to each armature; and a second power source connected across the fields.

In another aspect, there is provided a method of controlling traction power in a locomotive, the method comprising: identifying which of a plurality of traction motor armatures in the locomotive has a highest current reading; and ramping a traction motor field current to equal the highest current reading for the traction motor armatures.

In yet another aspect, there is provided a method for controlling traction power in a locomotive, the method comprising: initializing one or more traction motor fields on the locomotive with a minimum current to ensure smooth application of torque and to eliminate overspeed events.

BRIEF DESCRIPTION OF THE DRAWINGS

Embodiments will now be described by way of example only with reference to the appended drawings wherein.

DETAILED DESCRIPTION OF THE DRAWINGS

Wheelslip control using less space and requiring fewer expensive components can be achieved by separating the traction motor fields from the armatures and controlling them in such a way as to match the torque output of a series connected traction motor. The benefit is a design that is simpler in configuration, simpler to understand, less expensive to build and maintain, and can maximize the tractive effort available from each traction motor while inherently minimizing or eliminating wheelslip. While it is recognized that separately excited control of a DC motor's field is an established method of controlling wheelslip, where such control methodology is used, the DC motor is designed with its field windings requiring much smaller current (relative to armature current) and with more windings to generate the required magnetic flux to achieve torque and speed. There are unique challenges in utilizing separately excited control methodology and techniques on a DC traction motor designed for series field operation.

Since the earliest diesel electric locomotives, methods of detecting wheelslip and correcting them have evolved from crude and manually intensive methods such as listening for the sound of wheels slipping and manually reducing power, to more sophisticated and automated microprocessor-based controls. The following discusses various wheelslip detection designs as they have evolved over time.

Figure 1:
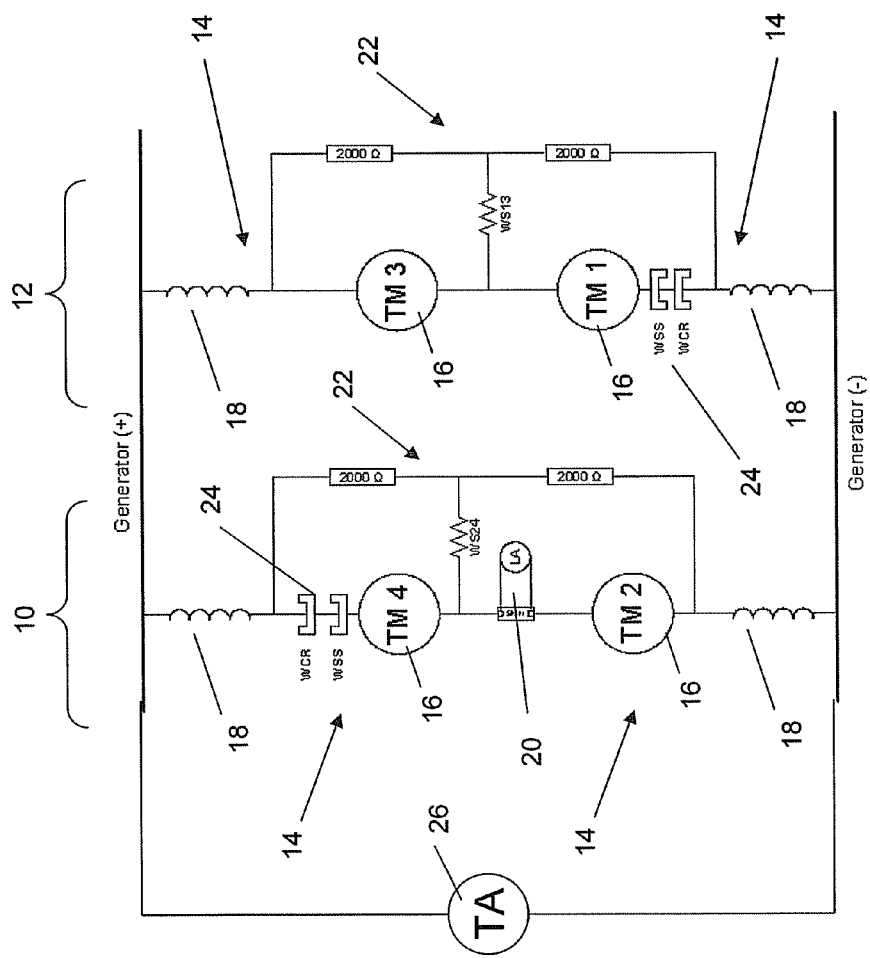
FIG. 1 is a schematic diagram of one configuration for addressing wheelslip.

FIG. 1 shows an early multi-stage detection system wherein two parallel paths 10, 12 are provided, each path 10, 12 comprising a pair of traction motors 14 connected in series with each other and one of the paths 10 includes a load ammeter (LA) 20. Each traction motor 14 comprises an armature 16 and field 18 as is well known in the art. In this configuration, the primary wheelslip detection method is achieved using a wheelslip detection relay "WS24" and "WS13" placed between two of the traction motors 14 in one of the paths 10, and a balancing bridge 22 of high impedance resistors. As long as the traction motors 14 are rotating at the same speed, the voltage across the armatures 16 will be the same. If a traction motor-powered wheel (not shown) experiences wheel slip, its armature 16 will speed up, generating a higher voltage across the armature 16. This will create an imbalance across the resistor bridge 22, forcing current to flow through the wheelslip detection relay WS24, WS13. The higher the imbalance, the more current will flow through the wheelslip relay's coil. At a predetermined level, the relay 22 will energize, closing interlocks that are integrated into the locomotive's power control system 200 (see FIGS. 11 and 12). The end result is that the output of the traction alternator 26 used to power the traction motors 14 is reduced significantly enough to stop the wheels from slipping.

In the event that the two traction motors 14 connected in series experience wheelslip at the same rate, there will be no imbalance across the resistors in the bridge 22, and thus no current flowing through the wheelslip detection relay WS24, WS13. In this scenario, the current flowing through the two traction motors 14 will fall as its armature speed increases. The traction motors' cabling is routed so that the two parallel paths 10, 12 go through a DC current transducer 24 in opposite directions to each other. As long as the two currents are the same, the net current measured by the current transducer 24 will be zero. This is because the WCR components are chosen in this configuration to be the same and the cables therefor are routed through the transducer so that current flow oppositely. As long as everything is balanced, the WCR measures a net difference of zero (0). When one current path is higher than the other, there is a net difference greater than zero, which is acted upon. For the WSS components, the same principle applies, however, the difference is the level of current imbalance which is acted upon. As one current path drops due to a wheel slip, the current transducer 24 notices a net current difference greater than zero. At a certain predetermined level, the transducer 24 energizes its contacts, that are also integrated with the locomotive's traction power control system, thus reducing power to all of the traction motors 14 and stopping the wheels from slipping.

In the example shown in FIG. 1, there are two transducers 24 (WCR and WSS) in each path, each with different activation set points. In the event the result of the first activation fails to prevent the wheels from slipping, the second activation will cause a more severe reduction of traction power to occur. If one of the transducers trips but the effect is not enough to slow down the wheels, i.e. they continue to slip, then the other will trip, causing a more severe reduction in power to the traction motors 14. It was found at this stage in the design evolution, the reduction in power was often a complete removal of power.

Detection methods such as that shown in FIG. 1 tended to be discrete with the ensuing actions also being discrete. In other words, the action taken is not always proportional to the severity of the wheelslip. An undesirable result of this is that while the wheels may be protected from uncontrolled slipping, there is a significant loss of power with every detection, resulting in reduced power transferred to the locomotive's wheels.

In the event that all wheels slip, with a system such as that shown in FIG. 1, the locomotive operator would be expected to notice a rapid reduction of current flowing to the traction motors 14 by observing a traction motor load ammeter 20. His/her reaction would then typically be to manually reduce the power output of the engine and consequently, the traction alternator.

Figure 2:
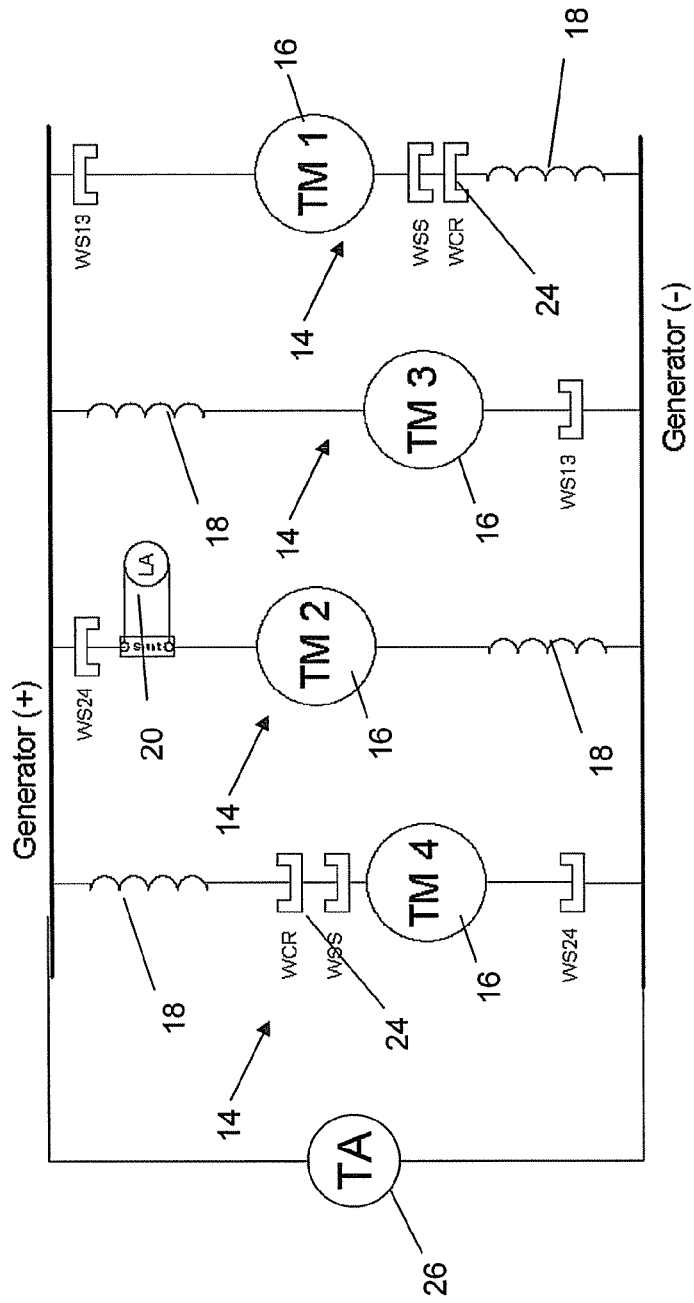
FIG. 2 is a schematic diagram of another configuration for addressing wheelslip.

Another configuration in the evolution of wheelslip detection is shown in FIG. 2. In FIG. 2, all traction motors 14 are connected in parallel. In this case, there is no need for a resistor bridge across two traction motor armatures 16. Consequently, detection methods are based on current imbalances as described earlier.

Future evolutions of the systems identified in FIG. 1 and FIG. 2 could use analog electronics to identify the severity of the slips in coarse increments with a more measured response. The result of this is more applied power to the wheels, resulting in more efficient utilization of the locomotive engine's available power.

Figure 3:
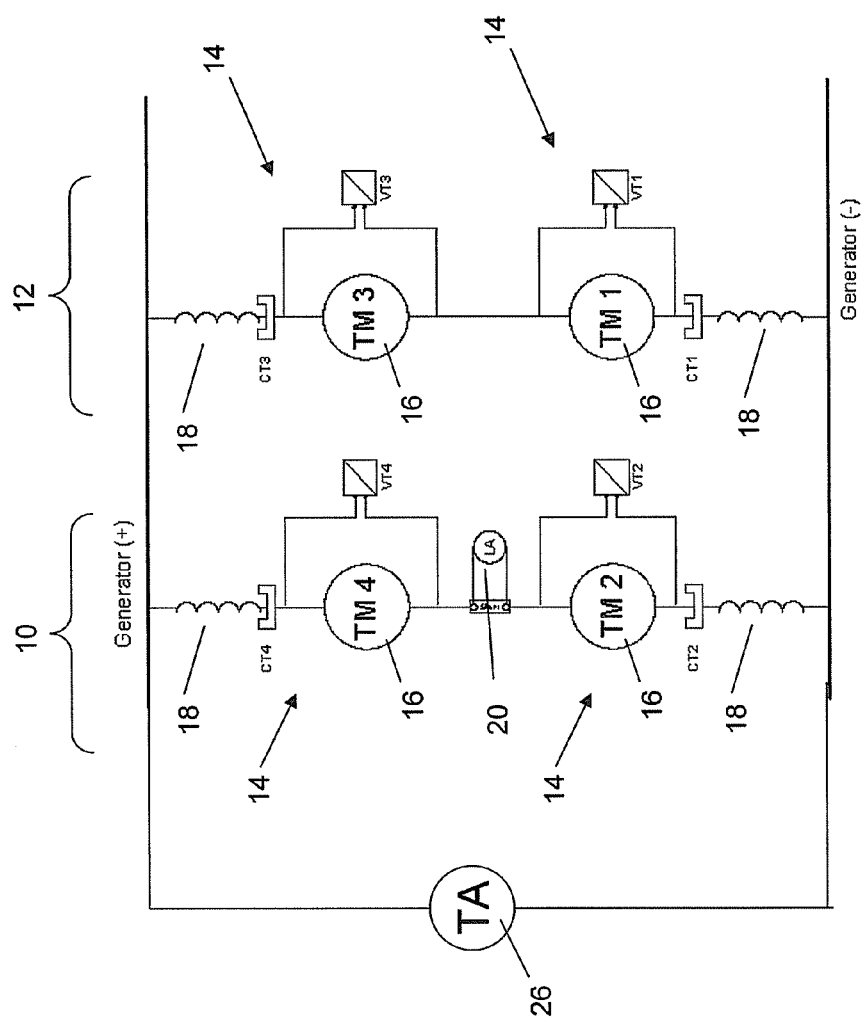
FIG. 3 is a schematic diagram of yet another configuration for addressing wheelslip.

With the advent of more advanced analog electronics and, eventually, microprocessor based control systems, the ability to actually measure armature rotation and detect wheelslip based on rotation velocity differences, can be achieved, instead of coarse measurements of voltage and current imbalances. This was typically done in one of two ways. The first way comprises putting probes on gears mounted to either the traction motor's armature 16 or on the wheel's axles. The second way, as shown in FIG. 3, was to characterize each traction motor armature's rotational velocity using accurate and fast electrical measurements of its individual volt and current values, e.g. as shown in FIG. 3 wherein VT1 to VT4 measure the voltage across the armature 16, and CT1 to CT4 measure the current through the armatures 16. The power and speed of the later generation control system allowed for fine incremental adjustments of the traction alternator's output, which in turn allowed for greater horsepower being delivered to the wheels.

A further development of this technology matches the traction motors armature speed to the locomotive's actual ground speed which is derived from radar. This allows absolute detection of a wheelslip in its earliest stages and also allows to purposely operate the wheels at a slight overspeed condition to increase tractive effort without danger of losing armature speed control.

An undesirable by-product of the above-described methods is that the solution to stopping active wheelslip involves reducing power to all of the traction motors 14. In other words, by using the above methods, one wheel starting to slip will cause a reduction in power to all traction motors 14.

Figure 4:
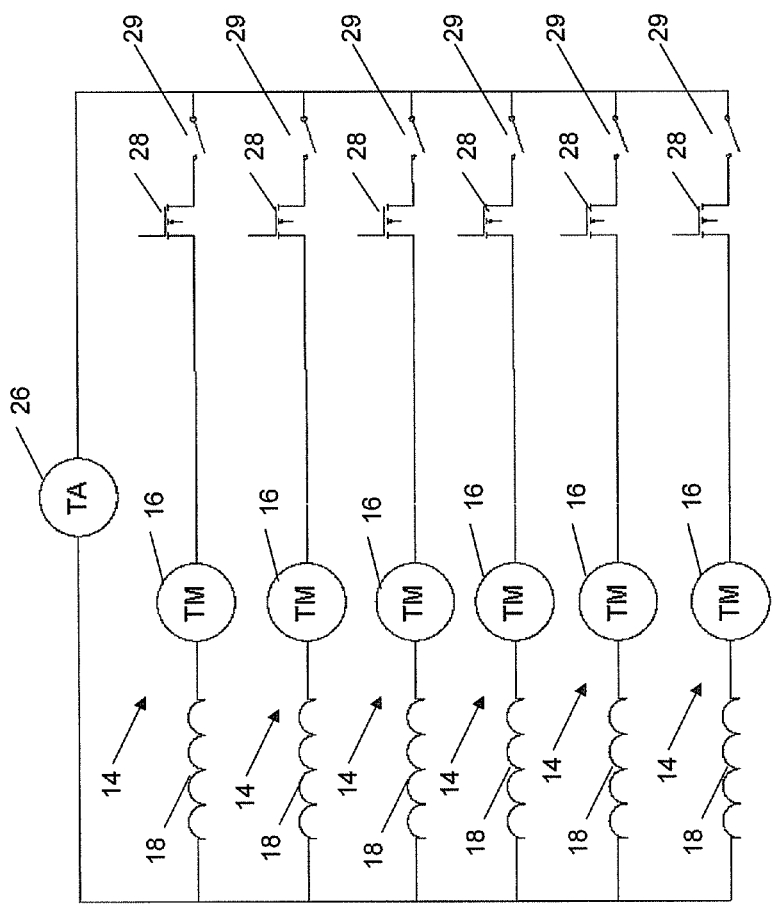
FIG. 4 is a schematic diagram of yet another configuration for addressing wheelslip.

As shown in FIG. 4, with the development of power electronics, some of the latest technologies can utilize high power transistors 28 (e.g., Insulated Gate Bipolar Transistor (IGBT) technology). This technology enables the control system 200 to remove power from the single traction motor 14 that is slipping while maintaining full power to the other non-slipping traction motors 14.

To address the above-described problems with current wheelslip solutions, it has been found that a configuration which takes advantage of two principles that define the DC traction motor's performance characteristics can be used. The first principle is that motor torque is proportional to, and is a product of, its field current and its armature current. This is demonstrated by the following Equation 1:

$$T_{tm} = k_t \phi i_a \tag{1}$$

Where:
$T_{tm}$ is the traction motor torque;
$k_t$ is the torque constant (a function of the motor's number of poles, conductors and parallel paths);
$\phi$ is the pole flux, which is proportional to field current; and
$i_a$ is the armature current.

The second principle is that the rotational velocity of the armature 16 is proportional to the voltage across the armature 16 and inversely proportional to its field current. This is demonstrated by the following Equation 2:

$$\omega = e/k_t \phi \tag{2}$$

Where:
- ω is the rotational velocity of the traction motor armature;
- e is the voltage across the armature;
- $k_t$ is the torque constant (a function of the motor's number of poles, conductors and parallel paths); and
- φ is the pole flux, which is proportional to field current.

Figure 5:
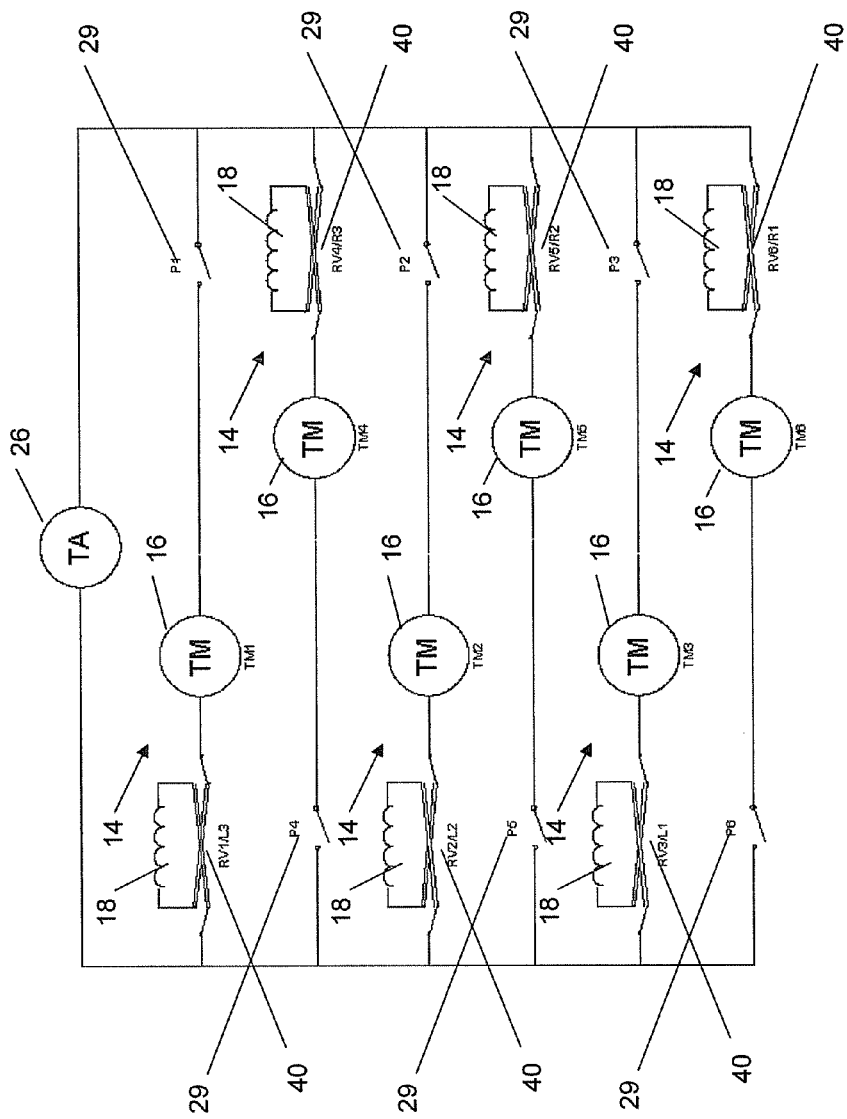
FIG. 5 is a schematic diagram of yet another configuration for addressing wheelslip.

In a series connected traction motor 14, torque is maximized since the current through the field 18 is always the same as that through the armature 16. By reconfiguring the connection from the traditional method shown in FIG. 5 to the one shown in FIG. 6, the control of the current through the field 18 is now separated from the control of the armature 16 current.

Figure 6:
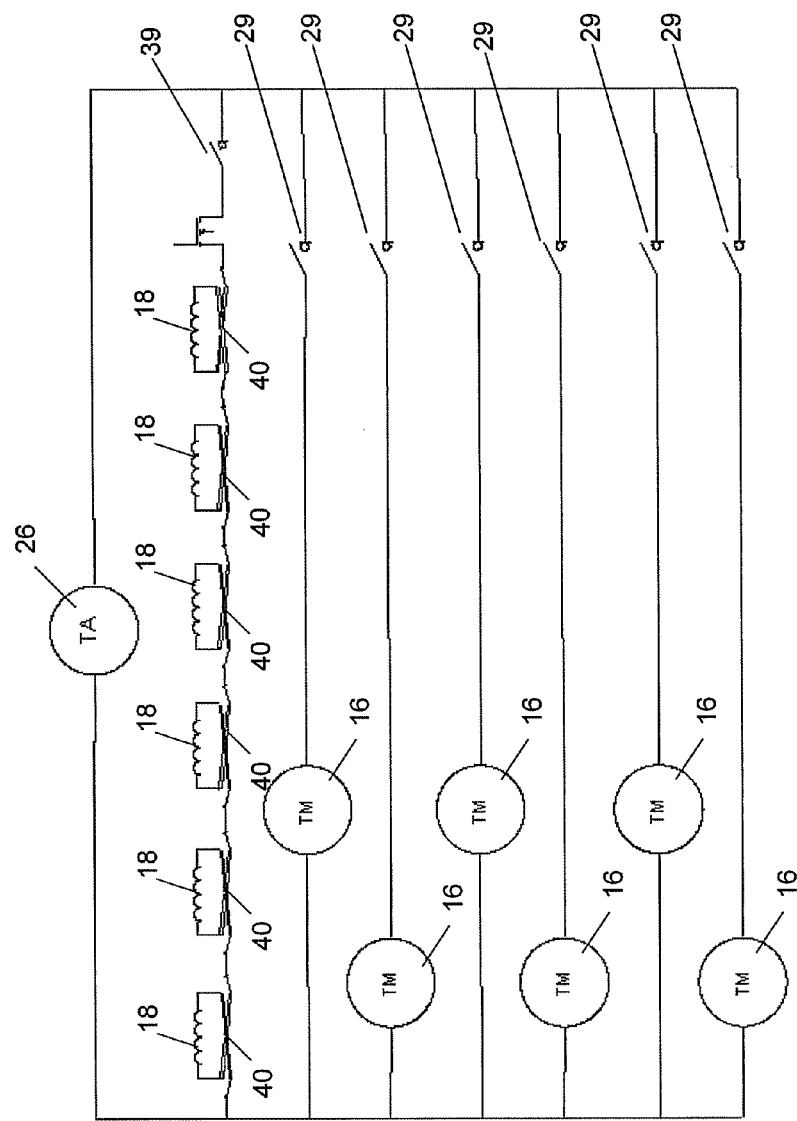
FIG. 6 is a schematic diagram of a configuration for addressing wheelslip comprising series connected fields and parallel connected armatures.

It may be noted that in FIG. 6, the fields 18 are powered by the same generator 26 that powers the traction motor armatures 16. In some locomotives, this may be problematic during low speed operation as the voltage across the armature 16 is lower than the voltage required to generate the current through the traction motor fields 18 required to optimize the traction motors' performance. The configuration shown in FIG. 6 can also have the disadvantage of providing an additional path for current, namely wherein the fields 18 connected in series provide the additional path; which may exceed the capacity of the generator to operate as expected, since, every device has safe operating limits which, if exceeded, may reduce its life or lead to destruction. The traction alternator TA 26 may have a capacity of, for example, 9,000 amps. In this case, with the original configuration of 6 series-connected traction motors 14, there are 6 equal paths, meaning that each traction motor 14 can operate at 1,500 amps continuously. By separating the fields 18 as will be described below, a seventh path is introduced. Since it is important that the fields 18 operate at the same current levels as the armatures 16 to ensure the desirable torque characteristics, this means that if the fields 18 are also provided with 1,500 amps, 10,500 amps are now required from the generator TA 26, which in this case would not be available under its capacity constraints. As such, when retrofitting existing locomotives that have such constraints, the configuration in FIG. 6 may go outside of the safe operating conditions. It can be appreciated that in cases where the locomotive's generator TA 26 has the capacity or can be designed to have such a capacity, the configuration in FIG. 6 can be used.

Figure 7:
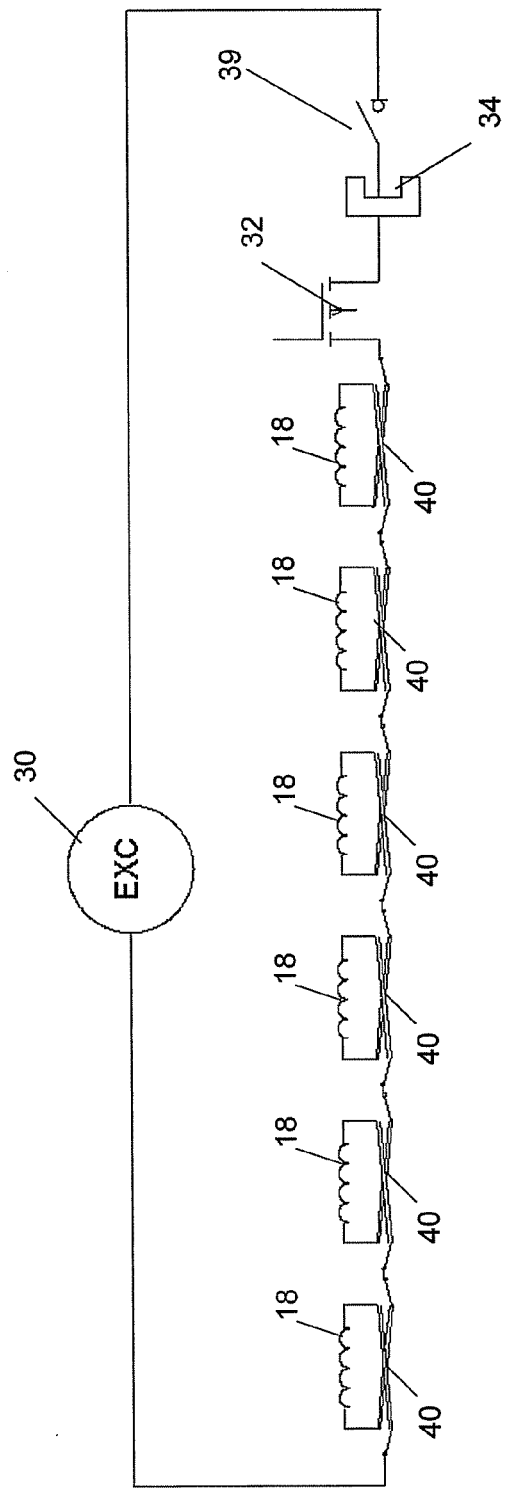
FIG. 7 is a schematic diagram of a portion of a configuration for addressing wheelslip wherein the fields are powered by a separate source.
Figure 8:
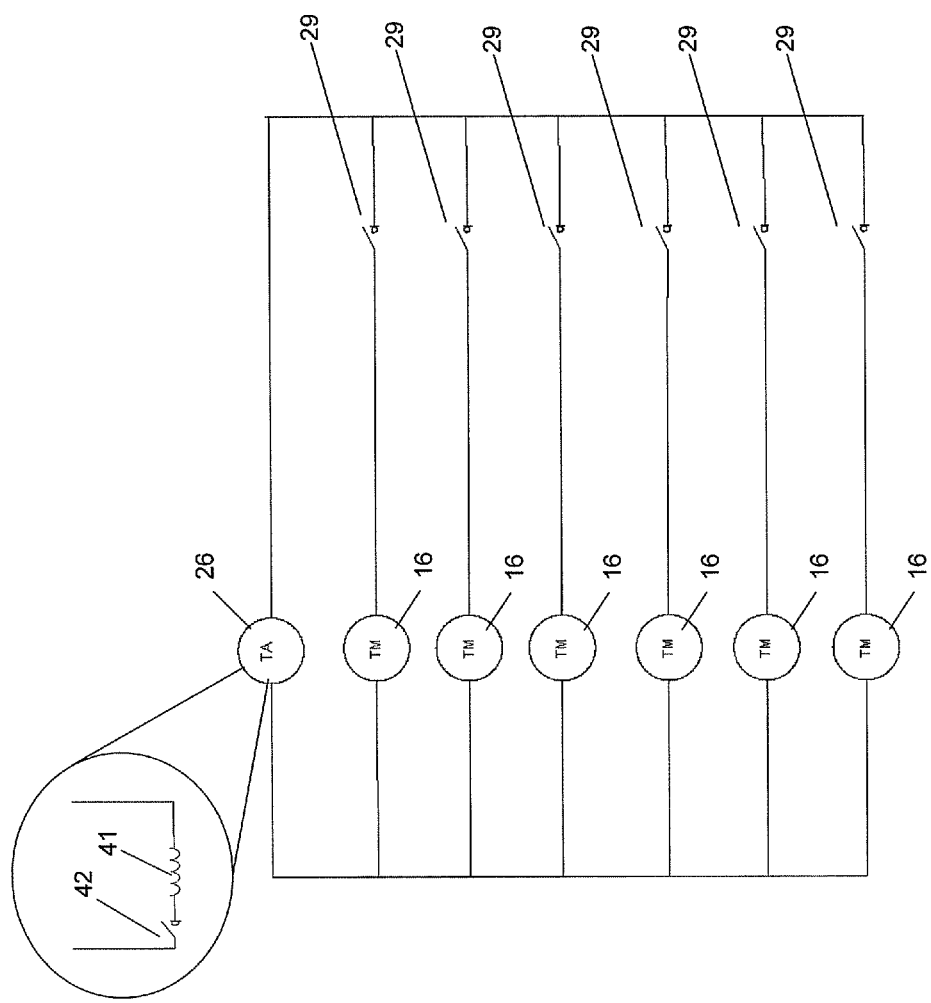
FIG. 8 is a schematic diagram of the other portion of the configuration of FIG. 7 wherein the armatures are powered by a separate source.

One method of overcoming issues with the configuration shown in FIG. 6, in particular when faced with a TA 26 having a capacity that does not allow for safe operating conditions in this configuration, is to provide an additional source of power 30 for the traction motor fields 18 that is separate from the traction alternator 16 as shown in FIGS. 7 and 8. In FIG. 7, the exciter 30 is used to output a DC source. This can be either a DC generator or an AC alternator which is then rectified to provide DC power. To determine the type of power required to effectively control the current through the fields 18, one needs to determine the maximum current required as well as the resistance of the fields 18. If for example, the field resistance of a traction motor is 0.015 ohms and there are six (6) traction motor fields 18 connected in series, then the overall resistance will be six (6) times 0.015, or 0.09 ohms. Further, if there is a requirement for a maximum of 1,500 amps, then ohm's law (volts=current*resistance) can be used to determine that 135 VDC is the voltage required to obtain the necessary current. Knowing the volts and amps, one can now determine that a power supply capable of delivering a minimum of 271 horsepower is necessary.

The control of the field current as defined later in FIGS. 9 and 10 can be accomplished either by controlling the output of the DC generator through a separate field controller or in the case of a constant voltage output alternator, by modulating the output with power electronics. In FIG. 7, this is demonstrated with the use of an IGBT 32. Direction control of the traction motor armature 16 is determined by the direction of current flow through the field coils 18 and is accomplished in FIG. 7 by the traditional use of special purpose mechanical contactors, also known as reversers 40 (as referred to below), to control the direction of the current through the traction motor fields 18. Current is measured in FIG. 7 using a current sensor 34 and the traction motor field contactor 39 is connected to the current sensor 34. FIG. 8 illustrates, in the enlarged portion, the traction alternator field 41 and traction alternator field contactor 42.

An additional benefit of providing a separate and dedicated source of power for the traction motor field current is that this power is additive to the locomotive's overall horsepower rating.

Figure 9:
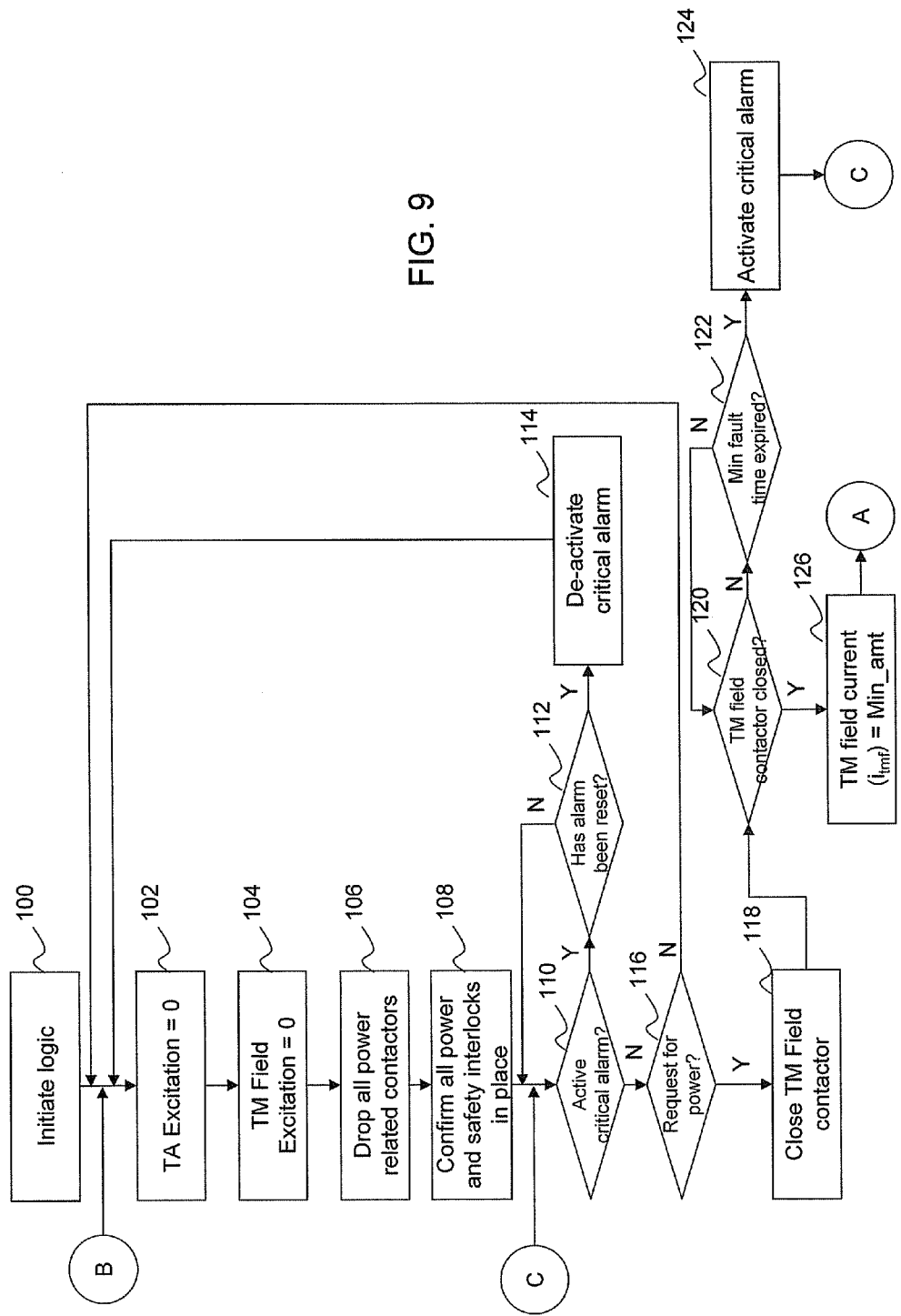
FIGS. 9 and 10 are flowcharts illustrating example computer executable instructions for controlling wheelslip using the configuration shown in FIGS. 7 and 8.
Figure 10:
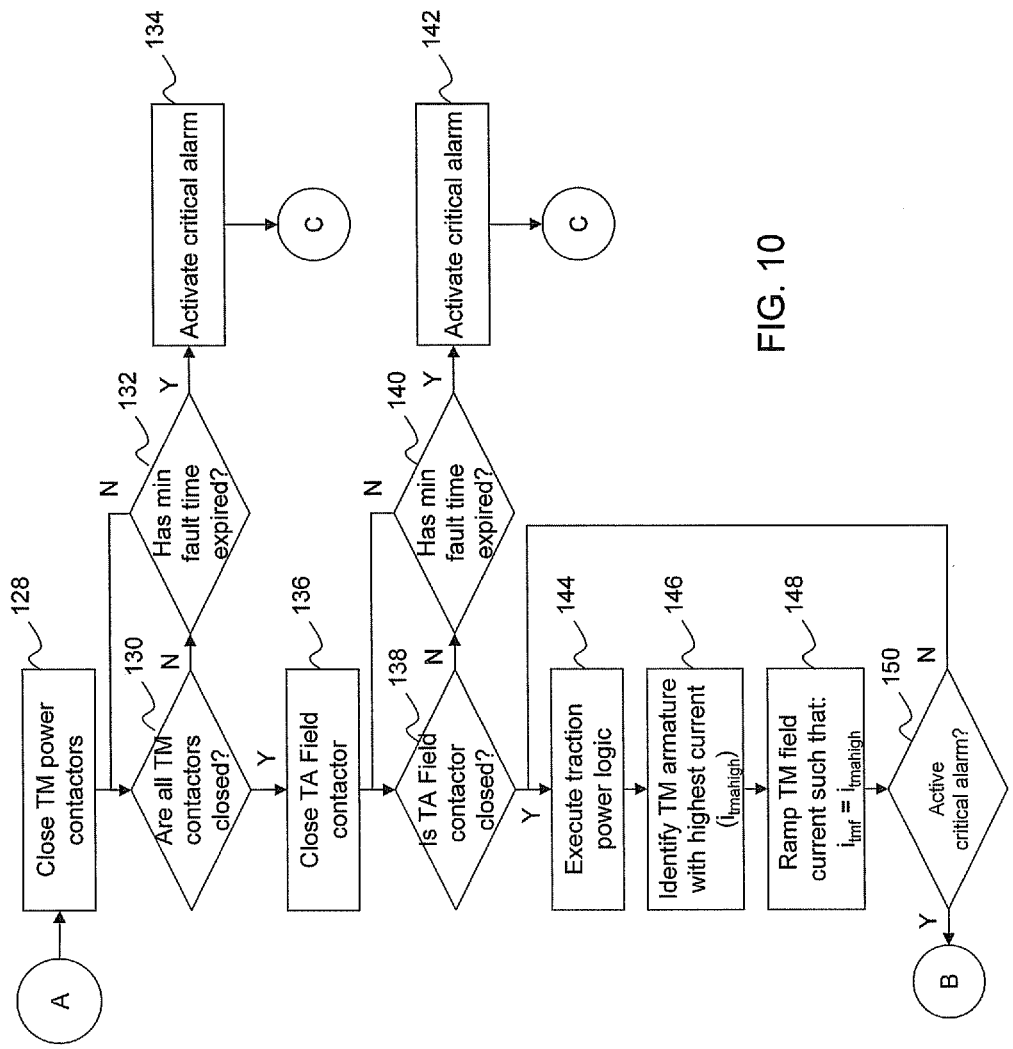

Example logic that can be used by a locomotive control system 200 to control the power to the traction motors 14 is shown in FIGS. 9 and 10. At 100 the logic is initialized. The excitation for the source TA 26 is set to zero at 102, and the excitation for the source EXC 30 is set to zero at 104. All TM power contactors 29 are dropped at 106 (i.e. de-energized or opened) and the control system 200 confirms that all power and safety interlocks are in place at 108. The control system 200 then determines at 110 if there is an active critical alarm, such as a hot engine or the application of the emergency brakes. If there is an active critical alarm, the control system 200 then determines at 112 if the active critical alarm has been reset. If so, the critical alarm is reset at 114 and the process repeats from operation 102.

Figure 11:
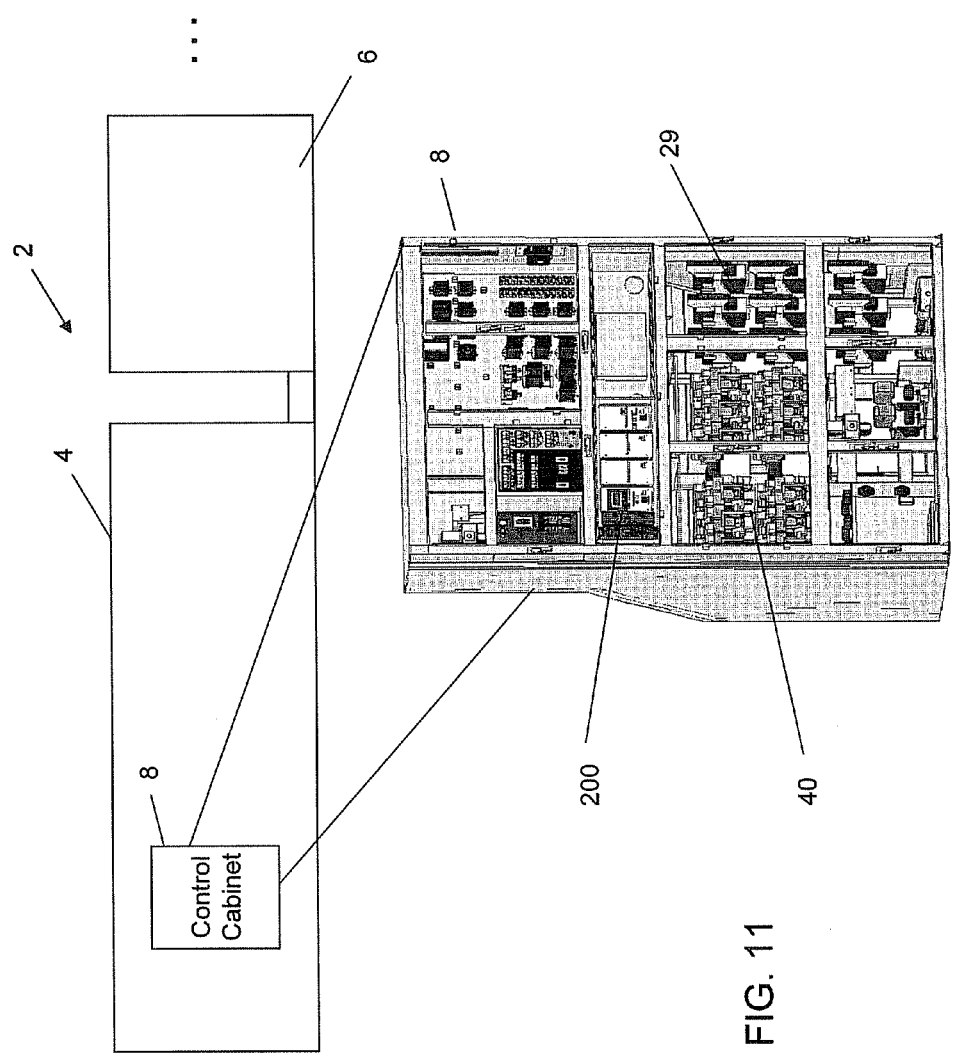
FIG. 11 is a schematic diagram of a locomotive having a control cabinet comprising a locomotive control system.

If the control system determines at 110 that there is no critical alarm, the control system then determines at 116 if there is a request for power from the locomotive 4 (see also FIG. 11). If not, the process returns to operation 102. If there is a request for power, the TM field contactor 39 is closed at 118. The control system 200 then determines whether or not the TM field contactor 39 has closed at 120. If not, the control system 200 determines if the minimum fault time has expired at 122. If not, the control system 200 checks again at 120. If the minimum fault time has expired, the control system 200 then activates a critical alarm at 124 and control moves to point C wherein the control system 200 looks for the active critical alarm.

If the control system 200 determines at 120 that the TM field contactor 39 is closed, the TM field current is set to equal the minimum amount, namely where $i_{tmf}$=Min_amt. The process then proceeds to point A, shown in FIG. 10. This minimal amount is to ensure that torque is produced smoothly once the armatures are powered and to prevent an overspeed situation in the event that a wheel has little or no friction. After proceeding to point A, the control system 200 then closes the TM power contactors 29 at 128 and determines at 130 if all TM power contactors 29 have been closed. If not, the control system 200 determines if the minimum fault time has expired at 132. If not, the process returns to operation 130. If so, the control system 200 activates a critical alarm at 134 and returns to point C (in FIG. 9) to look for the critical alarm.

If the control system 200 determines at 130 that all TM power contactors 29 are closed, the control system 200 then closes the TA field contactor 42 at 136 and determines at 138 if the TA field contactor 42 is closed. If not, the control system 200 determines if the minimum fault time has expired at 140. If not, the process returns to operation 138. If so, the control system 200 activates a critical alarm at 142 and returns to point C (in FIG. 9) to look for the critical alarm.

If the control system 200 determines at 138 that the TA field contactor 42 has been closed, the control system 200 then executes traction power logic at 144 and identifies the TM 16 with the highest current at 146 (e.g. $i_{tmahigh}$). Traction motor power control logic attempts to deliver the desired horsepower being requested by the operator to the traction motor while accounting for several considerations, including: How fast can this power be safely delivered or removed? How much horsepower can the engine predictably deliver without bogging down? What are the safe voltage and current limitations of the traction motor? What are the safe voltage and current limitations of traction alternator supplying the power to the traction motors? Are there any alarms or other dangerous conditions that require the power to be limited?

The TM field current is then ramped at 148 such that $i_{tmf}=i_{tmahigh}$. The control system 200 may then determine at 150 if there is a request for more power and, if so, repeats at operation 144. If not, the control system 200 returns to point B in FIG. 9.

It can be appreciated that torque is maximized by matching the current through the traction motor field 18 to the armature 16 with the highest current. By placing all of the traction motor fields 18 in series, current is identical in all of the fields 18. In the event that one or more traction motor armatures 16 begin to slip, it will increase its back EMF which will drive its armature current lower. As can be seen in Equation 1, when the armature current drops, torque also drops. It should also be noted that since the armature voltage exists across the generator with no other impedances, its voltage remains the same. Equation 2 ensures that if the armature voltage and field current do not change, neither will the armature speed. Overall, the benefit of the configuration shown in FIGS. 7 and 8 is inherent wheel slip control and maximized torque transmitted to each traction motor 14.

Figure 12:
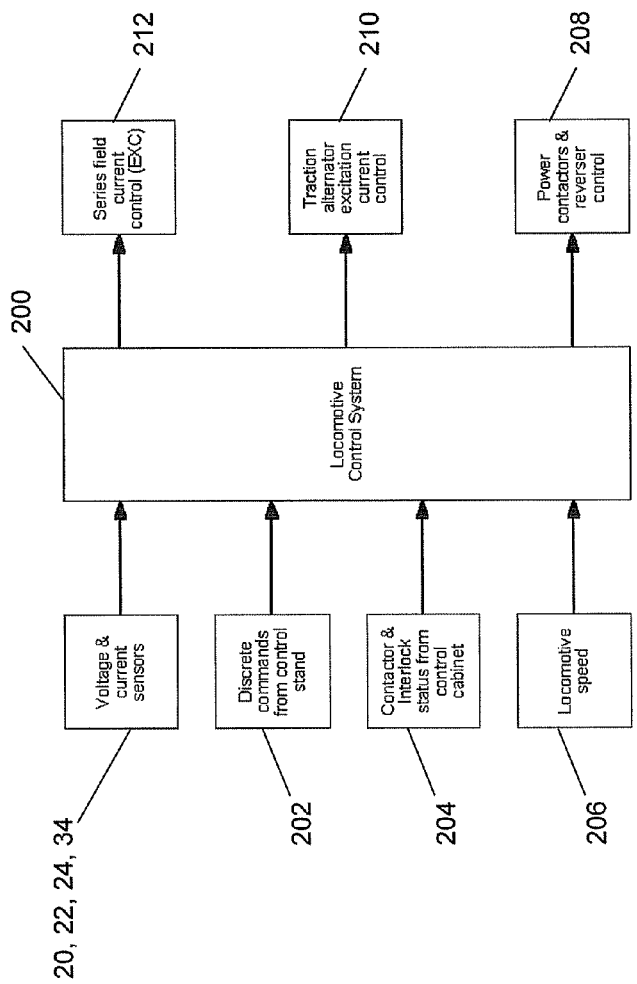
FIG. 12 is a block diagram illustrating further detail of a locomotive control system.

Turning to FIG. 11, an example train 2 is shown for illustrative purposes only. The train 2 in this example comprises a locomotive 4 pulling one or more rail cars 6. The locomotive 4 comprises, among other things, a control cabinet 8. As can be seen in the enlarged portion in FIG. 11, the control cabinet 8 houses, among other things, the locomotive control system 200, the reversers 40, and the power contactors 29. FIG. 12 illustrates further detail of the control system 200. It can be seen that the locomotive control system 200 is configured to obtain readings from the voltage and current sensors (e.g. 20, 22, 24, 34 described above), discrete commands 202 from the control stand (e.g. operator inputs), contactor and interlock status information 204 from the control cabinet 8 (i.e. via connections to various locomotive sub-systems—not shown), and locomotive speed readings 206. The control system 200 in this example configuration then provides control instructions 212 to a series field current (EXC) subsystem, control instructions 210 to a traction alternator excitation sub-system, and control instructions to the power contactors 29 and reversers 40 at 208.

Although the above principles have been described with reference to certain specific embodiments, various modifications thereof will be apparent to those skilled in the art without departing from the scope of the claims appended hereto.

The invention claimed is:

1. A system for powering a locomotive, the system comprising:
    a plurality of traction motor assemblies, each assembly comprising an armature and a field;
    a first power source connected in parallel with all of the traction motor armatures;
    a second power source connected in series with across said traction motor fields, all of said traction motor fields being connected to each other in series; and
    a controller comprising a processor configured for:
        identifying which of a plurality of traction motor armatures in the locomotive has a highest current reading; and
        ramping a traction motor field current to equal the highest current reading for the traction motor armatures.

2. The system of claim 1, wherein the second power source comprises a direct current (DC) generator or an alternating current (AC) alternator rectified to provide DC power.

3. The system of claim 1, further comprising a field controller for controlling an output of the second power source.

4. The system of claim 1, further comprising power electronics for modulating an output of the second power source.

5. The system of claim 4, wherein the power electronics comprises at least one insulated gate bipolar transistor (IGBT).

6. The system of claim 1, further comprising a current sensor for measuring current through said fields.

7. A method for controlling traction power in a locomotive, the method comprising:
    identifying which of a plurality of traction motor armatures in the locomotive has a highest current reading, the plurality of traction motor armatures being connected in parallel with a first power source; and
    ramping a traction motor field current to equal the highest current reading for the traction motor armatures, the locomotive comprising a second power source connected in series with across said traction motor fields, all of said traction motor fields being connected to each other in series.

8. The method of claim 7, wherein the tractor motor field current is controlled using a field controller.

9. The method of claim 7, wherein the tractor motor field current is controlled using power electronics.

10. The method of claim 9, wherein the power electronics comprises at least one insulated gate bipolar transistor (IGBT).

11. The method of claim 7, wherein the traction motor field current is providing using a direct current (DC) generator or an alternating current (AC) alternator rectified to provide DC power.

12. A method for controlling traction power in a locomotive, the method comprising:
    initializing one or more traction motor fields on the locomotive with a minimum current to ensure a controlled application of torque and to eliminate overspeed events;
    wherein the traction motor fields are powered by a separate power source from corresponding traction motor armatures.

13. The method of claim 12, wherein tractor motor field current is controlled using a field controller.

14. The method of claim 12, wherein tractor motor field current is controlled using power electronics.

15. The method of claim 14, wherein the power electronics comprises at least one insulated gate bipolar transistor (IGBT).

16. The method of claim 12, wherein traction motor field current is providing using a direct current (DC) generator or an alternating current (AC) alternator rectified to provide DC power.

17. A system for controlling traction power in a locomotive, the system comprising:
    a plurality of traction motor assemblies, each assembly comprising an armature and a field;

a first power source connected in parallel with all of the traction motor armatures;

a second power source connected in series with across said traction motor fields, all of said traction motor fields being connected to each other in series; and a controller comprising a processor configured for:
  initializing one or more traction motor fields on the locomotive with a minimum current to ensure a controlled application of torque and to eliminate overspeed events.

18. The system of claim 17, wherein tractor motor field current is controlled using a field controller.

19. The system of claim 17, wherein tractor motor field current is controlled using power electronics.

20. The system of claim 19, wherein the power electronics comprises at least one insulated gate bipolar transistor (IGBT).

21. The system of claim 17, wherein traction motor field current is providing using a direct current (DC) generator or an alternating current (AC) alternator rectified to provide DC power.

22. A locomotive control system for powering a locomotive, locomotive comprising a plurality of traction motor assemblies, each assembly comprising an armature and a field; a first power source connected in parallel with all of the traction motor armatures; and a second power source connected in series with across said traction motor fields, all of said traction motor fields being connected to each other in series, the control system comprising:

a processor configured for operating the locomotive according to at least one of:
  (a) identifying which of a plurality of traction motor armatures in the locomotive has a highest current reading; and ramping a traction motor field current to equal the highest current reading for the traction motor armatures; and
  (b) initializing one or more traction motor fields on the locomotive with a minimum current to ensure a controlled application of torque and to eliminate overspeed events.

23. The system of claim 22, wherein tractor motor field current is controlled using a field controller.

24. The system of claim 22, wherein tractor motor field current is controlled using power electronics.

25. The system of claim 24, wherein the power electronics comprises at least one insulated gate bipolar transistor (IGBT).

26. The system of claim 22, wherein traction motor field current is providing using a direct current (DC) generator or an alternating current (AC) alternator rectified to provide DC power.

* * * * *